908,438.
HANDLE FOR BOOK STRAPS.
APPLICATION FILED FEB. 3, 1908.
Patented Jan. 5, 1909.
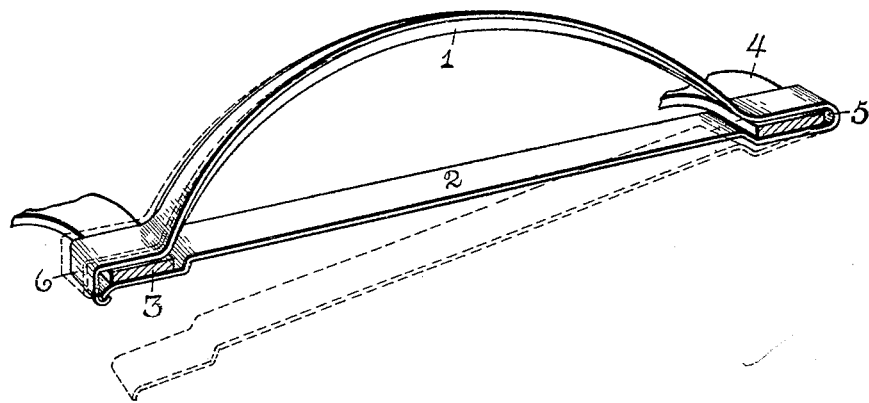

UNITED STATES PATENT OFFICE.

HENNING BACKSTROM, OF LOUISVILLE, KENTUCKY.

HANDLE FOR BOOK-STRAPS.

No. 908,438.   Specification of Letters Patent.   Patented Jan. 5, 1909.

Application filed February 3, 1908. Serial No. 414,064.

*To all whom it may concern:*

Be it known that I, HENNING BACKSTROM, a citizen of the United States, residing at Louisville, in the county of Jefferson and State of Kentucky, have invented a new and useful Handle for Book-Straps, of which the following is a specification.

This invention relates to handles for book straps and the like, and some of the objects of my improvement are, facility of removing the handle from and applying it to the straps after they have been fastened, cheapness of manufacture, security of holding and to produce a handle that is light and not bulky.

These objects I attain by the device illustrated in the accompanying drawing, which is a perspective view.

In the drawing 1 represents the part to which the hand is applied, and 2 a lower bar integral therewith which extends between and under the straps 3 and 4. The entire device is preferably made of a single strip of sheet metal. The handle part proper, 1, being slightly curved upward at the edge, leaving a channel on top and round underneath to render it more comfortable to the hand and impart a bracing effect. At 5 the metal is folded under so as to leave an opening suitable to receive strap 4 and then extends across underneath handle portion 1 to the opposite end 6. At end 6 the handle portion 1 is bent downward, inward, and upward, forming a hook adapted to receive the free end of bar 2, which in turn is bent somewhat downward at its free end to enter and catch firmly in the hook portion of end 6 of handle portion 1. Bar 2 has its middle portion somewhat elevated above the parts at the ends where straps 3 and 4 are received. By this means, when the straps enter the depressed openings provided for them, they are kept spread apart in their proper position relative to one another, and the handle is kept in its proper position between the straps. Supposing now that two straps have been buckled about a pile of books or a package, and it is desired to apply this handle, if the handle is found close, that is, having the free end of bar 2 hooked in the end 6 of handle portion 1, the free end of bar 2 may be released by slightly springing handle portion 1 to the position shown by the dotted lines, by which effort the hooked end 6 is withdrawn from the free end of bar 2. The free end of bar 2 may then be inserted under the straps until they enter the opening in the ends of the handle provided therefor. Handle 1 is then again sprung to the position shown by the dotted lines and end 6 pressed down over the free end of bar 2. When handle 1 is released, the hook of end 6 is drawn in and catches under the free end of bar 2, thus closing the handle and securing it on the straps. To remove the handle from the straps it is necessary simply to depress handle portion 1 and hold it, at the same time raising end 6 while it is kept free from the free end of bar 2, thus unhooking the handle portion from bar 2. Bar 2 may then be withdrawn from under the straps.

This handle, being simply a strip of sheet metal bent into the form shown, is inexpensive to manufacture, is light, and compact, and may be easily carried in the pocket when not in use.

Having thus described my invention, I claim—

1. In a device of the character described, a top bar, and a bottom bar formed integral therewith, the top bar having an arched central portion, forming a grip, and flattened end portions, the lower bar having depressed portions opposite the flattened end portions of the upper bar, forming passages for straps, the upper bar having its free end bent downward at right angles, to form one side of a passage, with a return on its inner side to form a catch for the lower bar.

2. A handle for book straps, comprising an upper handle portion 1, and a lower bar 2, said handle portion and said lower bar being integral at one end and forming together a loop adapted to receive a strap, and having their opposite ends free, said handle portion being provided with a hook to receive the corresponding end of said lower bar, and an opening being provided between said handle portion and said lower bar adapted to receive a strap.

HENNING BACKSTROM.

Witnesses:
D. B. MEDANICH,
M. C. ROLLWAGE.